UNITED STATES PATENT OFFICE.

JAMES H. THORP, OF NEW YORK, N. Y.

IMPROVEMENT IN THE MANUFACTURE OF ARTIFICIAL MARBLE AND STONE.

Specification forming part of Letters Patent No. 221,630, dated November 11, 1879; application filed October 15, 1879.

*To all whom it may concern:*

Be it known that I, JAMES HARRY THORP, of the city, county, and State of New York, have invented an Improvement in the Manufacture of Artificial Marble and Stone; and I hereby declare the following to be a full, clear, and exact description thereof.

My invention relates to the production of beautiful imitations of different varieties of marble, and also artificial stone, which shall possess great strength, hardness, and durability; and my invention consists in a composition formed of certain ingredients combined and chemically treated in such a manner as to produce a hard crystallized substance which is capable of successfully resisting the action of water, frost, and heat, and is therefore particularly adapted for use as a building material in any climate, and for an infinite variety of other purposes, as will be hereinafter set forth.

I take gypsum, selenite, or sulphate of lime in its natural state, and subject it in an oven or other suitable receptacle to a nearly welding heat, and then grind or pulverize it until it is as fine as flour, after which I add to every two hundred pounds of this substance five pounds of pulverized alum, and intimately mix the two together in a dry state. I then place in a suitable vessel seventy-five gallons of soft water, and dissolve therein two pounds of copperas, one pound of nitrate of soda, and five pounds of rock-salt, and thoroughly and intimately incorporate or combine the whole together by stirring. I then take any desired quantity of the pulverized mixture above described, and add and thoroughly stir into it a sufficient quantity of the solution above referred to until the mass has nearly the consistence of a thick paste, after which it is rebaked, and then ground to a fine powder and passed through a bolting-cloth, the resultant product being what I term "Thorp's fine cement." If a finer cement is desired, I dampen this S. fine cement again with the same solution and rebake, grind, and bolt it a second time, forming what I term "Thorp's S. fine cement;" and should a still finer quality be required, which I term "Thorp's S. S. S. fine cement," I add to the above solution and dissolve therein two pounds of borax, and dampen with this the S. S. fine cement, and again rebake, grind, and pass it through the bolting-cloth.

To form a cement for iron, I take one pound of Thorp's cement, and add and thoroughly mix therewith one pound of litharge, one pound of oxide of lead, and four gills of glycerine, (more or less,) which causes the compound to rapidly harden, and renders it insoluble in acids, unless quite concentrated, and also capable of effectually resisting heat.

To make artificial marble, I take a quantity of the cement above described, of either of the three qualities or degrees of fineness desired, and add and thoroughly stir into it a sufficient quantity of the solution first described to form a thick paste, which is then placed in suitable molds to give it any desired shapes, and compressed, after which it is allowed to remain until hard and dry, when, after being removed, it can be polished in the same manner as ordinary marble.

The above-described composition may be made of any color desired by the addition of the necessary pigment, and colored or variegated marbles may be imitated by the employment of different pigments or colors, which are added to the paste and mingled or manipulated in a well-known manner to produce the desired imitation of the veins or figures of natural marble, the blocks or other articles made of this material presenting, when finished, a beautiful appearance, and bearing a perfect resemblance to natural marble.

To make artificial stone for buildings, sidewalks, monuments, and cemetery-work, or other purposes, such as dams, cisterns, foundations for houses, cellar-floors, well-tubing, drain and sewer pipes, &c., I take twelve parts of pure silicious sand or gravel and one part of Portland or other cement (more or less) and mix them thoroughly together in a dry state, and then dampen this mixture with a sufficient quantity of the first-described liquid compound, or solution composed of the several ingredients specified, after which it is tamped in the ordinary manner.

If it should be desired to have the stone harden very rapidly, I add one quart of Venice turpentine to the seventy-five gallons of the solution referred to.

The above-described chemical solution produces a perfect crystallization of the marble or stone compound, which is thus solidified and rendered extremely hard and durable, the particles being thereby caused to adhere so closely and tenaciously together as to render the material, when dry, fire-proof, and effectually prevent the entrance of air or moisture, and the consequent injury or destruction of the material by frost if exposed to low temperatures.

Artificial marble made as above described can be economically and advantageously employed for building-blocks, and also for a great variety of other purposes, such as the interior or exterior decoration of buildings, monuments, gravestones, flooring, table-tops, sidewalks, &c , it being easily and cheaply converted into any desired forms by the employment of suitable molds, whereby the great expense which is incurred in cutting natural marble into the artistic and elaborate designs so frequently employed is entirely avoided, thus rendering it possible to erect buildings embellished with beautiful architectural designs at a much less cost than where natural marble or stone is employed.

Instead of molding the composition into blocks or other articles, it may be applied to the inner or outer walls of buildings or other surfaces in a plastic state, and, after being smoothed, allowed to dry thereon.

What I claim as my invention, and desire to secure by Letters Patent, is—

1. An artificial marble or stone composed of pulverized gypsum, selenite, or sulphate of lime and alum, treated as described, or of sand or gravel and cement, united and solidified by mixing therewith a chemical solution formed of water, copperas, nitrate of soda, and rock-salt, substantially as and for the purpose set forth.

2. The herein described liquid compound, consisting of water, copperas, nitrate of soda, and rock-salt, substantially in the proportions named, for the purpose of producing the crystallization of the artificial marble or stone, as described.

3. The method herein described of producing a fine cement for artificial marble by mixing pulverized gypsum, selenite, or sulphate of lime and alum with a solution composed of water, copperas, nitrate of soda, and rock-salt, with or without borax, and afterward baking, grinding, and bolting the same, substantially as and for the purpose set forth.

Witness my hand this 6th day of October, A. D. 1879.

JAMES HARRY THORP.

In presence of—
FRIDRICH WILHELM ELFELDT,
OTTO FEHR.